US010396678B2

(12) United States Patent
Uda et al.

(10) Patent No.: US 10,396,678 B2
(45) Date of Patent: Aug. 27, 2019

(54) POWER CONVERTER

(71) Applicant: Mitsubishi Electric Corporation, Chiyoda-ku, Tokyo (JP)

(72) Inventors: Ryosuke Uda, Tokyo (JP); Kenichi Kuroda, Tokyo (JP); Masashi Kitayama, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 319 days.

(21) Appl. No.: 15/516,832

(22) PCT Filed: Oct. 8, 2014

(86) PCT No.: PCT/JP2014/076896
§ 371 (c)(1),
(2) Date: Apr. 4, 2017

(87) PCT Pub. No.: WO2016/056073
PCT Pub. Date: Apr. 14, 2016

(65) Prior Publication Data

US 2017/0310237 A1 Oct. 26, 2017

(51) Int. Cl.
*H02J 1/00* (2006.01)
*H02M 7/217* (2006.01)
(Continued)

(52) U.S. Cl.
CPC .......... *H02M 7/217* (2013.01); *H02H 7/1257* (2013.01); *H02M 1/32* (2013.01);
(Continued)

(58) Field of Classification Search
USPC .......................................................... 307/72
See application file for complete search history.

(56) References Cited

U.S. PATENT DOCUMENTS 8,456,786 B2 6/2013 Vögeli
2008/0232145 A1 9/2008 Hiller et al.
(Continued)

FOREIGN PATENT DOCUMENTS

JP 2009-506736 2/2009
JP 2011-193615 9/2011
(Continued)

OTHER PUBLICATIONS

International Search Report (PCT/ISA/210) dated Dec. 9, 2014, by the Japanese Patent Office as the International Searching Authority for International Application No. PCT/JP2014/076896.
(Continued)

*Primary Examiner* — Rexford N Barnie
*Assistant Examiner* — Toan T Vu
(74) *Attorney, Agent, or Firm* — Buchanan Ingersoll & Rooney PC

(57) ABSTRACT

In a multilevel converter, three first rectifying elements are respectively connected between three arms and a negative voltage terminal. Three second rectifying elements are respectively connected to the three first rectifying elements in antiparallel. During a normal operation, current flows in the three first rectifying elements and the three second rectifying elements. When a short circuit accident occurs between two DC power transmission lines, the three first rectifying elements are brought into the non-conductive state, thereby interrupting and quickly attenuating inter-arm direct current flowing in four arms and the like.

8 Claims, 14 Drawing Sheets

(51) Int. Cl.

| | |
|---|---|
| ***H02M 7/12*** | (2006.01) |
| ***H02M 1/32*** | (2007.01) |
| ***H02M 7/537*** | (2006.01) |
| ***H02M 7/483*** | (2007.01) |
| ***H02H 7/125*** | (2006.01) |

(52) U.S. Cl.
CPC ............ *H02M 7/12* (2013.01); *H02M 7/483* (2013.01); *H02M 7/537* (2013.01); *H02M 2007/4835* (2013.01)

(56) References Cited

U.S. PATENT DOCUMENTS

| | | | | |
|---|---|---|---|---|
| 2013/0215658 | A1 | 8/2013 | Jakob et al. | |
| 2015/0333660 | A1* | 11/2015 | Kim ........................ | H02M 1/32 363/123 |

FOREIGN PATENT DOCUMENTS

| | | | |
|---|---|---|---|
| JP | 2013-169088 | A | 8/2013 |
| JP | 2013-255422 | A | 12/2013 |
| JP | 5622978 | B1 | 11/2014 |
| JP | WO 2015/121983 | A1 | 8/2015 |
| WO | WO 2007/023064 | A1 | 3/2007 |

OTHER PUBLICATIONS

Written Opinion (PCT/ISA/237) dated Dec. 9, 2014, by the Japanese Patent Office as the International Searching Authority for International Application No. PCT/JP2014/076896.

Modern HVDC PLUS application of VSC in Modular Multilevel Converter topology, K. Friedrich, IEEE 2010, Jul. 2010.

Grinberg et al., "Study of Overcurrent Protection for Modular Multilevel Converter", 2014 IEEE Energy Conversion Congress and Exposition (ECCE), IEEE, Sep. 14, 2014, pp. 3401-3407, XP032680626.

Extended European Search Report dated Apr. 30, 2018, issued by the European Patent Office in corresponding European Application No. 14903809.3. (9 pages).

Office Action (Communication pursuant to Article 94(3) EPC) dated Nov. 8, 2018, by the European Patent Office in corresponding European Patent Application No. 14903809.3. (4 pages).

* cited by examiner

POWER CONVERTER

TECHNICAL FIELD

The present invention relates to a power converter, particularly, a power converter configured to transmit and receive power between an AC power supply and a DC power supply.

BACKGROUND ART

A half bridge type modular multilevel converter, which is a conventional power converter, includes: a first arm connected between a positive voltage terminal and an AC terminal; and a second arm connected between the AC terminal and a negative voltage terminal, each of the first and second arms including a plurality of unit cells connected in cascade.

Each unit cell includes: a capacitor configured to be charged to a DC voltage; first and second switching elements connected in series between positive and negative electrodes of the capacitor; first and second diodes respectively connected to the first and second switching elements in anti-parallel; and a mechanical bypass switch connected to the second diode in parallel. In each of the arms, the mechanical bypass switches of the plurality of unit cells are connected in series.

By controlling the plurality of unit cells of each arm, one of DC power and AC power can be converted to the other of the DC power and the AC power. If a certain unit cell is broken, a mechanical bypass switch of the unit cell is brought into the conductive state to short-circuit the unit cell, thereby continuing the operation of the multilevel converter (for example, see Patent Document 1 (Japanese Patent Laying-Open No. 2011-193615) and Non-Patent Document 1 ("Modern HVDC PLUS application of VSC in Modular Multilevel Converter topology", K. Friedrich, IEEE 2010, July 2010)).

When a short circuit accident occurs in a DC power transmission line in a DC power transmission system including such a multilevel converter, a large line direct current flows in the first or second switching element of each unit cell (see FIG. 10). By bringing the first and second switching elements of each unit cell into the non-conductive state when a short circuit accident occurs, the first and second switching elements can be protected. However, when the first and second switching elements are brought into the non-conductive state, the line direct current flows in the second diode of each unit cell. Accordingly, a technique of protecting the second diode is required.

Patent Document 2 (Japanese National Patent Publication No. 2009-506736) discloses a technique of protecting the second diode by: connecting a thyristor to the second diode in parallel; turning on the thyristor when a short circuit accident occurs; and diverting a line direct current to the second diode and the thyristor.

CITATION LIST

Patent Document

PTD 1: Japanese Patent Laying-Open No. 2011-193615

PTD 2: Japanese National Patent Publication No. 2009-506736

Non Patent Document

NPD 1: "Modern HVDC PLUS application of VSC in Modular Multilevel Converter topology", K. Friedrich, IEEE 2010, July 2010

SUMMARY OF INVENTION

Technical Problem

However, in the technique of Patent Document 2 (Japanese National Patent Publication No. 2009-506736), since the thyristor is provided in each unit cell, the same number of thyristors as the number of the unit cells are required, thus resulting in high cost and large size of the device.

As another technique of protecting the second diode, the following procedure is considered: when a short circuit accident occurs, the first and second switching elements are brought into the non-conductive state and the mechanical bypass switch is brought into the conductive state before the second diode is damaged by the line direct current. According to this procedure, the line direct current flowing in the second diode is transferred to the mechanical bypass switch, thereby protecting the first and second switching elements and the second diode.

However, when the mechanical bypass switches of all the unit cells are brought into the conductive state, each of the first and second arms is brought into the conductive state, with the result that an inter-arm direct current starts to circulate in a path including two groups each constituted of first and second arms (see FIG. 12). In order to recover the DC power transmission system immediately from a short circuit accident, the line direct current and the inter-arm direct current need to be removed immediately.

By interrupting the supplying of the AC power to the multilevel converter, the supplying of the line direct current is interrupted, whereby the line direct current is attenuated by arc resistance of the point of accident. The inter-arm direct current is attenuated at a time constant determined by a ratio of inductance to resistance value of the multilevel converter. However, in the DC power transmission system, since the resistance value is made small in order to reduce power loss, it takes a long time to attenuate the inter-arm direct current, disadvantageously.

Accordingly, the present invention has a main object to provide a power converter capable of protecting a unit cell and quickly attenuating an inter-arm direct current upon a short circuit accident.

Solution To Problem

A power converter according to the present invention is a power converter configured to transmit and receive power between an AC power supply and a DC power supply, the power converter including: first and second DC terminals configured to transmit and receive DC power to and from the DC power supply; an AC terminal configured to transmit and receive AC power to and from the AC power supply; a first arm connected between the first DC temiinal and the AC terminal; and a second arm connected between the AC terminal and the second DC terminal. Each of the first and second arms includes a plurality of unit cells connected in cascade. Each unit cell includes a capacitor, first and second switching elements, first and second diodes, and a mechanical bypass switch, the capacitor being configured to be charged to a predetermined DC voltage, the first and second switching elements being connected in series between electrodes of the capacitor, the first and second diodes being respectively connected to the first and second switching elements in antiparallel, the mechanical bypass switch being connected to the first or second diode in parallel. The mechanical bypass switches of the plurality of unit cells are connected in series in each of the first and second arms. The first and second switching elements of each unit cell are configured to alternately come into a conductive state during a normal operation, both the first and second switching elements of each unit cell being configured to come into a non-conductive state when a short circuit accident occurs at the DC power supply side. The mechanical bypass switch of each unit cell is configured to be in the non-conductive state during the normal operation, the mechanical bypass switch of each unit cell being configured to come into the conductive state when the short circuit accident occurs. The power converter further includes: a first rectifying element connected between the first and second DC terminals in series with the first and second arms, the first rectifying element being configured to be in the conductive state during the normal operation to permit a current to flow in a first direction, the first rectifying element being configured to come into the non-conductive state when the short circuit accident occurs; and a second rectifying element connected to the first rectifying element in antiparallel, the second rectifying element being configured to permit the current to flow in a second direction opposite to the first direction.

Advantageous Effects of Invention

In the power converter according to the present invention, the mechanical bypass switch is brought into the conductive state when the short circuit accident occurs, thereby protecting the unit cell from a short circuit current. Furthermore, the first rectifying element connected to the first and second arms in series is brought into the non-conductive state, thereby quickly attenuating the inter-arm direct current.

DESCRIPTION OF EMBODIMENTS

Figure 1:
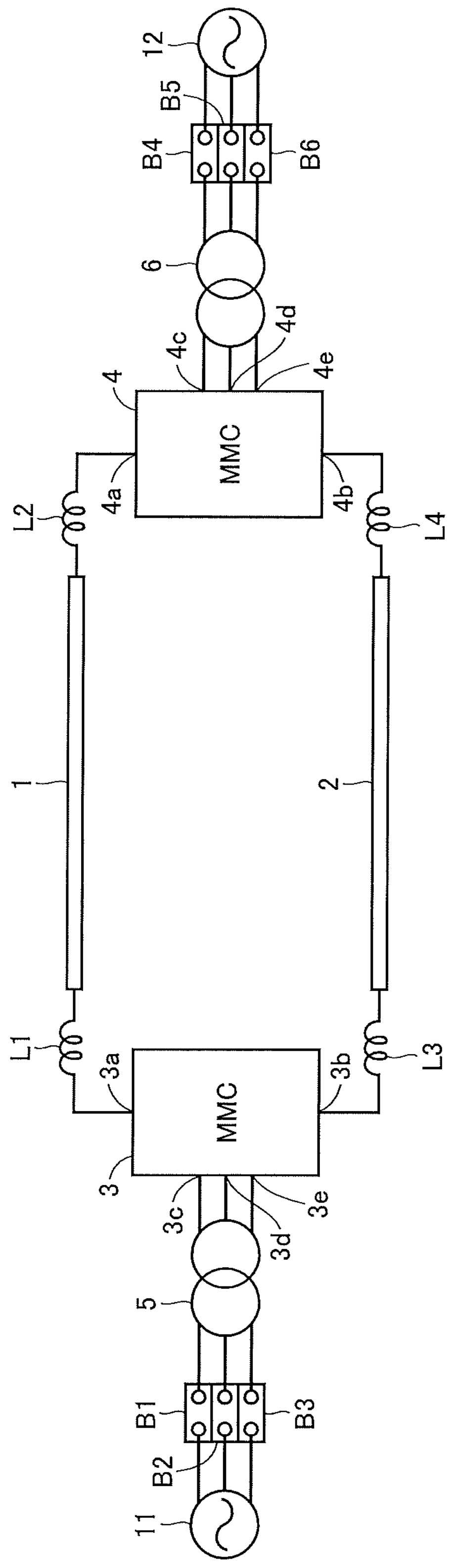
FIG. 1 is a circuit block diagram showing a configuration of a DC power transmission system according to one embodiment of the present invention.

FIG. 1 is a circuit block diagram showing a configuration of a DC power transmission system according to one embodiment of the present invention. In FIG. 1, the DC power transmission system includes DC power transmission lines 1, 2, interrupters B1 to B6, reactors L1 to L4, half bridge type modular multilevel converters (MMC) 3, 4, three-phase transformers 5, 6, and AC power systems 11, 12.

Multilevel converter 3 is a bidirectional power converter including a positive voltage terminal 3*a*, a negative voltage terminal 3*b*, and three AC terminals 3*c* to 3*e*, and is configured to convert one of DC power and three-phase AC power into the other of the DC power and the three-phase AC power. Positive voltage terminal 3*a* and negative voltage terminal 3*b* are used to transmit and receive the DC power, and three AC terminals 3*c* to 3*e* are used to transmit and receive the three-phase AC power.

Multilevel converter 4 is a bidirectional power converter including a positive voltage terminal 4*a*, a negative voltage terminal 4*b*, and three AC terminals 4*c* to 4*e*, and is configured to convert one of DC power and three-phase AC power into the other of the DC power and the three-phase AC power. Positive voltage terminal 4*a* and negative voltage terminal 4*b* are used to transmit and receive the DC power, and three AC terminals 4*c* to 4*e* are used to transmit and receive the three-phase AC power.

DC power transmission line 1 has one end connected to positive voltage terminal 3*a* of multilevel converter 3 via reactor L1, and has the other end connected to positive voltage terminal 4*a* of multilevel converter 4 via reactor L2.

DC power transmission line 2 has one end connected to negative voltage terminal 3*b* of multilevel converter 3 via reactor L3, and has the other end connected to negative voltage terminal 4*b* of multilevel converter 4 via reactor L4.

Each of DC power transmission lines 1, 2 is used to transmit DC power. Reactors L1, L3 are configured to suppress a signal, which is generated in multilevel converter 3 and has a switching frequency, from flowing to DC power transmission lines 1, 2. Reactors L2, L4 are configured to suppress a signal, which is generated in multilevel converter 4 and has a switching frequency, from flowing to DC power transmission lines 1, 2.

Three AC terminals 3*c* to 3*e* of multilevel converter 3 are connected to respective three secondary side terminals of three-phase transformer 5. Three-phase transformer 5 has three primary side terminals connected to respective three-phase power transmission lines of AC power system 11 via interrupters B1 to B3.

Three AC terminals 4*c* to 4*e* of multilevel converter 4 are connected to respective three secondary side terminals of three-phase transformer 6. Three-phase transformer 6 has three primary side terminals connected to respective three-phase power transmission lines of AC power system 12 via interrupters B8 to B10.

Three-phase transformer 5 transmits and receives the three-phase AC power between multilevel converter 3 and AC power system 11. Three-phase transformer 6 transmits and receives the three-phase AC power between multilevel converter 4 and AC power system 12. Interrupters B1 to B6 are in the conductive state during a normal operation, and are brought into the non-conductive state when a short circuit accident occurs between DC power transmission lines 1, 2 to protect the DC power transmission system, for example.

Next, the following describes an operation of the DC power transmission system. When supplying three-phase AC power from AC power system 11 to AC power system 12, the three-phase AC power of AC power system 11 is supplied to multilevel converter 3 via interrupters B1 to B3 and three-phase transformer 5 and is converted into DC power in multilevel converter 3. The DC power thus generated in multilevel converter 3 is supplied to multilevel converter 4 via DC power transmission lines 1, 2 and the like, and is converted into three-phase AC power in multilevel converter 4. The three-phase AC power generated in multilevel converter 4 is supplied to AC power system 12 via three-phase transformer 6 and interrupters B4 to B6.

On this occasion, a DC voltage between terminals 3*a*, 3*b* of multilevel converter 3 is set at a voltage slightly larger than a DC voltage between terminals 4*a*, 4*b* of multilevel converter 4, and the DC power is supplied from multilevel converter 3 to multilevel converter 4 via DC power transmission lines 1, 2 and the like.

Multilevel converter 3 operates as an AC/DC converter configured to convert the AC power, supplied from the AC power supply (AC power system 11, interrupters B1 to B3, and three-phase transformer 5), into DC power. Multilevel converter 4 operates as a DC/AC converter configured to convert the DC power, supplied from the DC power supply (multilevel converter 3 and the like), into AC power.

On the other hand, when supplying three-phase AC power from AC power system 12 to AC power system 11, the three-phase AC power of AC power system 12 is supplied to multilevel converter 4 via interrupters B4 to B6 and three-phase transformer 6 and is converted into DC power in multilevel converter 4. The DC power thus generated in multilevel converter 4 is supplied to multilevel converter 3 via DC power transmission lines 1, 2 and the like, and is converted into three-phase AC power in multilevel converter 3. The three-phase AC power generated in multilevel converter 3 is supplied to AC power system 11 via three-phase transformer 5 and interrupters B1 to B3.

On this occasion, a DC voltage between terminals 4*a*, 4*b* of multilevel converter 4 is set at a voltage slightly larger than a DC voltage between terminals 3*a*, 3*b* of multilevel converter 3, and the DC power is supplied from multilevel converter 4 to multilevel converter 3 via DC power transmission lines 1, 2 and the like.

Multilevel converter 4 operates as an AC/DC converter configured to convert the AC power, supplied from the AC power supply (AC power system 12, interrupters B4 to B6, and three-phase transformer 6), into DC power. Multilevel converter 3 operates as a DC/AC converter configured to convert the DC power, supplied from the DC power supply (multilevel converter 4 and the like), into AC power.

When a short circuit accident occurs between DC power transmission lines 1, 2, interrupters B1 to B6 are brought into the non-conductive state and the operations of multilevel converters 3, 4 are stopped, thereby protecting the DC power transmission system.

Figure 2:
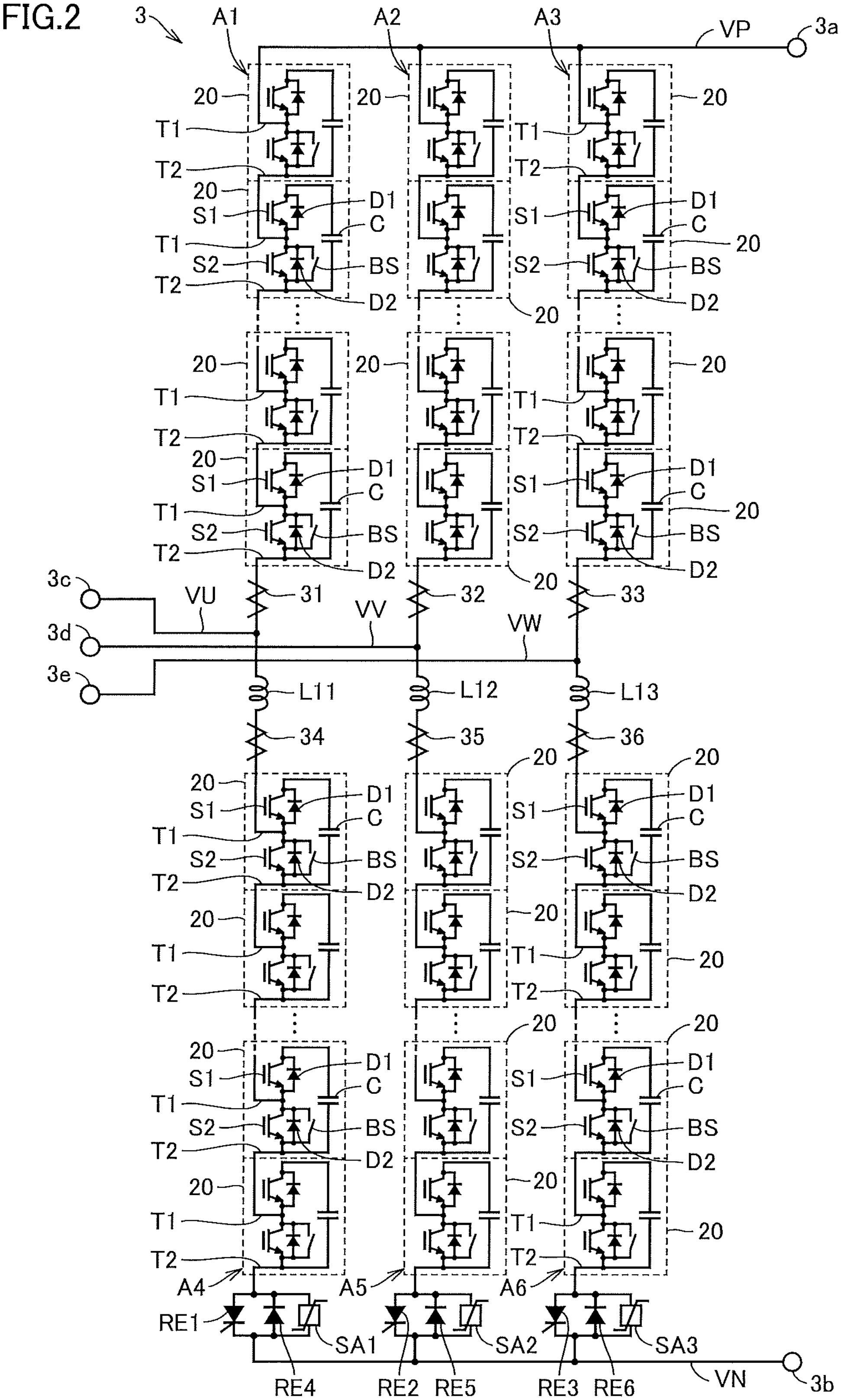
FIG. 2 is a circuit diagram showing a major portion of the multilevel converter shown in FIG. 1.

FIG. 2 is a circuit diagram showing a major portion of multilevel converter 3. In FIG. 2, multilevel converter 3 includes positive voltage terminal 3*a* (first DC terminal), negative voltage terminal 3*b* (second DC terminal), AC terminals 3*c* to 3*e*, arms A1 to A6, current detectors 31 to 36, reactors L11 to L13, rectifying elements RE1 to RE6, and surge arresters SA1 to SA3.

Positive voltage terminal 3*a* is supplied with a positive DC voltage VP from multilevel converters 3, 4. Negative voltage terminal 3*b* is supplied with a negative DC voltage VN from multilevel converters 3, 4. AC terminal 3*c* is supplied with a U-phase AC voltage VU from three-phase transformer 5 and multilevel converter 3. AC terminal 3*d* is supplied with a V-phase AC voltage VV from three-phase transformer 5 and multilevel converter 3. AC terminal 3*e* is supplied with a W-phase AC voltage VW from three-phase transformer 5 and multilevel converter 3. The phases of three-phase AC voltages VU, VV, VW are shifted by 120°.

Arms A1 to A3 have ends connected to positive voltage terminal 3*a*, and have the other ends respectively connected to AC terminals 3*c* to 3*e*. Current detector 31 is provided between the other end of arm A1 and AC terminal 3*c*, detects an instantaneous value of a current IA1 flowing in arm A1, and outputs a signal indicating the detected value. Current detector 32 is provided between the other end of arm A2 and AC terminal 3*d*, detects an instantaneous value of a current IA2 flowing in arm A2, and outputs a signal indicating the detected value. Current detector 33 is provided between the other end of arm A3 and AC terminal 3*e*, detects an instantaneous value of a current IA3 flowing in arm A3, and outputs a signal indicating the detected value.

Reactor L11, arm A4, and rectifying element RE1 are connected in series between AC terminal 3*c* and negative voltage terminal 3*b*. Reactor L12, arm A5, and rectifying element RE2 are connected in series between AC terminal 3*d* and negative voltage terminal 3*b*. Reactor L13, arm A6, and rectifying element RE3 are connected in series between AC terminal 3*e* and negative voltage terminal 3*b*. Rectifying elements RE4 to RE7 are respectively connected to rectifying elements RE1 to RE3 in antiparallel. Surge arresters SA1 to SA3 are respectively connected to rectifying elements RE1 to RE3 in parallel.

Reactors L11 to L13 attenuate signals, which are generated in arms A1 to A6 and have the switching frequency. Current detector 34 is provided between reactor L11 and arm A4, detects an instantaneous value of a current IA4 flowing in arm A4, and outputs a signal indicating the detected value. Current detector 35 is provided between reactor L12 and arm A5, detects an instantaneous value of a current IA5 flowing in arm A5, and outputs a signal indicating the detected value. Current detector 36 is provided between reactor L13 and arm A6, detects an instantaneous value of a current IA6 flowing in arm A6, and outputs a signal indicating the detected value.

During the normal operation, rectifying elements RE1 to RE3 are configured to be in the conductive state to permit currents to flow in a direction (first direction) from arms A4 to A6 to negative voltage terminal 3*b*, and are configured to come into the non-conductive state when a short circuit accident occurs. Rectifying elements RE4 to RE6 are configured to permit currents to flow in a direction (second direction) from negative voltage terminal 3*b* to arms A4 to A6. Each of surge arresters SA1 to SA3 is configured to permit flow of a surge current generated when a short circuit accident or the like occurs, so as to protect rectifying elements RE1 to RE6.

Figure 3:
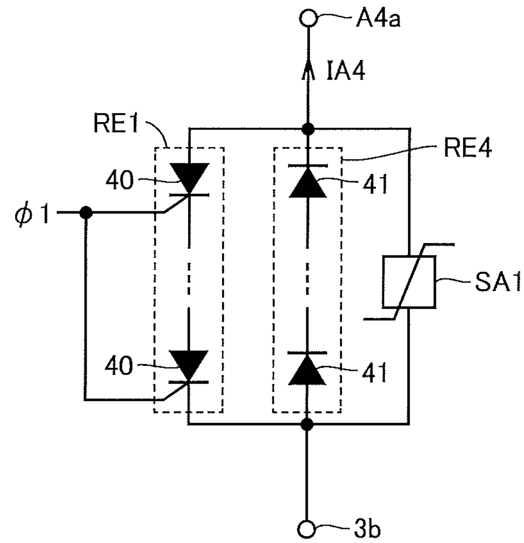
FIG. 3 is a circuit diagram showing a configuration of a rectifying element shown in FIG. 2.

As shown in FIG. 3, rectifying element RE1 includes a plurality of thyristors 40 connected in series. The plurality of thyristors 40 are connected in series in a forward direction between one terminal A4*a* of arm A4 and negative voltage terminal 3*b*. Each of the plurality of thyristors 40 has a gate via which a control signal ϕ1 is received. As shown in FIG. 3, rectifying element RE4 includes a plurality of diodes 41 connected in series. The plurality of diodes 41 are connected in the forward direction between negative voltage terminal 3*b* and one terminal A4*a* of arm A4.

Figure 4:
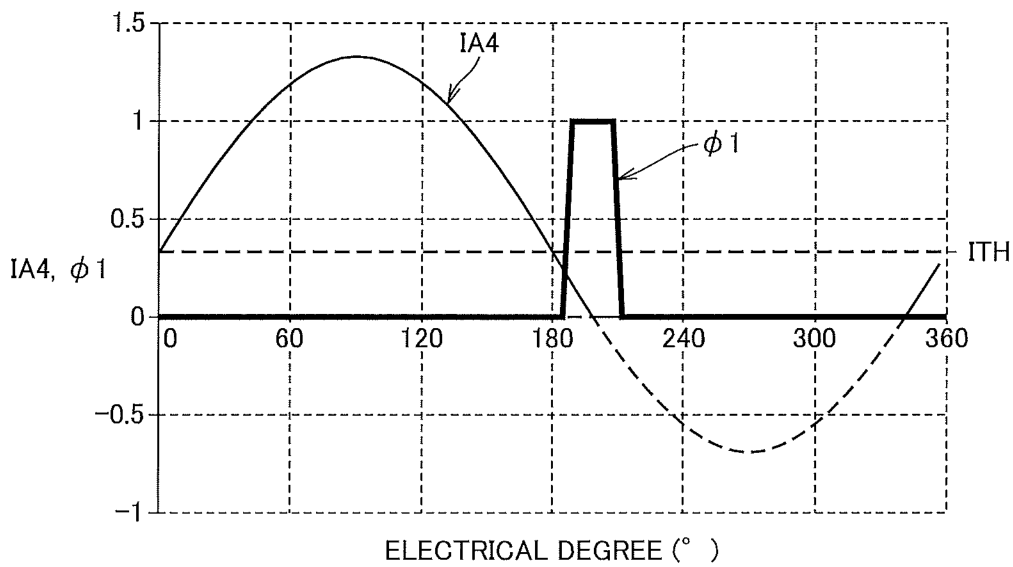
FIG. 4 is a time chart indicating an operation of the rectifying element shown in FIG. 3.

FIG. 4 is a time chart indicating operations of rectifying elements RE1, RE4. In FIG. 4, current IA4 flowing in arm A4 is changed in the form of a sine wave. It is assumed that the forward direction of diode 41 represents a positive direction of current IA4 and the forward direction of thyristor 40 represents a negative direction of current IA4. During a period in which current IA4 is a positive current, current IA4 flows in diode 41. A portion of current IA4 indicated by a solid line is a current flowing in diode 41.

When current IA4 is higher than a predetermined threshold value current ITH, control signal ϕ1 is set at the "L" level. When current IA4 becomes lower than threshold value current ITH, control signal ϕ1 is set at the "H" level and held for a predetermined time. When current IA4 is changed from the positive polarity to the negative polarity during the period in which control signal ϕ1 is at the "H" level, diode 41 is turned off and thyristor 40 is turned on, whereby negative current IA4 flow in the plurality of thyristors 40.

Once turned on, thyristor 40 is maintained at the conductive state during the period in which negative current IA4 flows in thyristor 40, even when control signal ϕ1 is set at the "L" level. A portion of current IA4 in FIG. 4 indicated by a broken line is a current flowing in thyristor 40. When current IA4 is changed from the negative value to the positive value, thyristor 40 is turned off and diode 41 is turned on, whereby current IA4 flows in the plurality of diodes 41.

When a short circuit accident occurs in DC power transmission lines 1, 2, control signal ϕ1 is fixed at the "L" level and thyristor 40 is fixed at the non-conductive state. Accordingly, an inter-arm direct current cannot be circulated between the arms (for example, between A1, A2, A5, and A4), and is accordingly abruptly attenuated.

Also, as with rectifying element RE1, each of rectifying elements RE2, RE3 includes a plurality of thyristors 40 connected in series. However, thyristors 40 of rectifying elements RE2, RE3 have respective gates via which control signals ϕ2, ϕ3 are received. As with control signal ϕ1, control signals ϕ2, ϕ3 are respectively generated based on currents IA5, IA6 flowing in arms A5, A6. Moreover, as with rectifying element RE4, each of rectifying elements RES, RE6 includes a plurality of diodes 41 connected in series.

Figure 5:
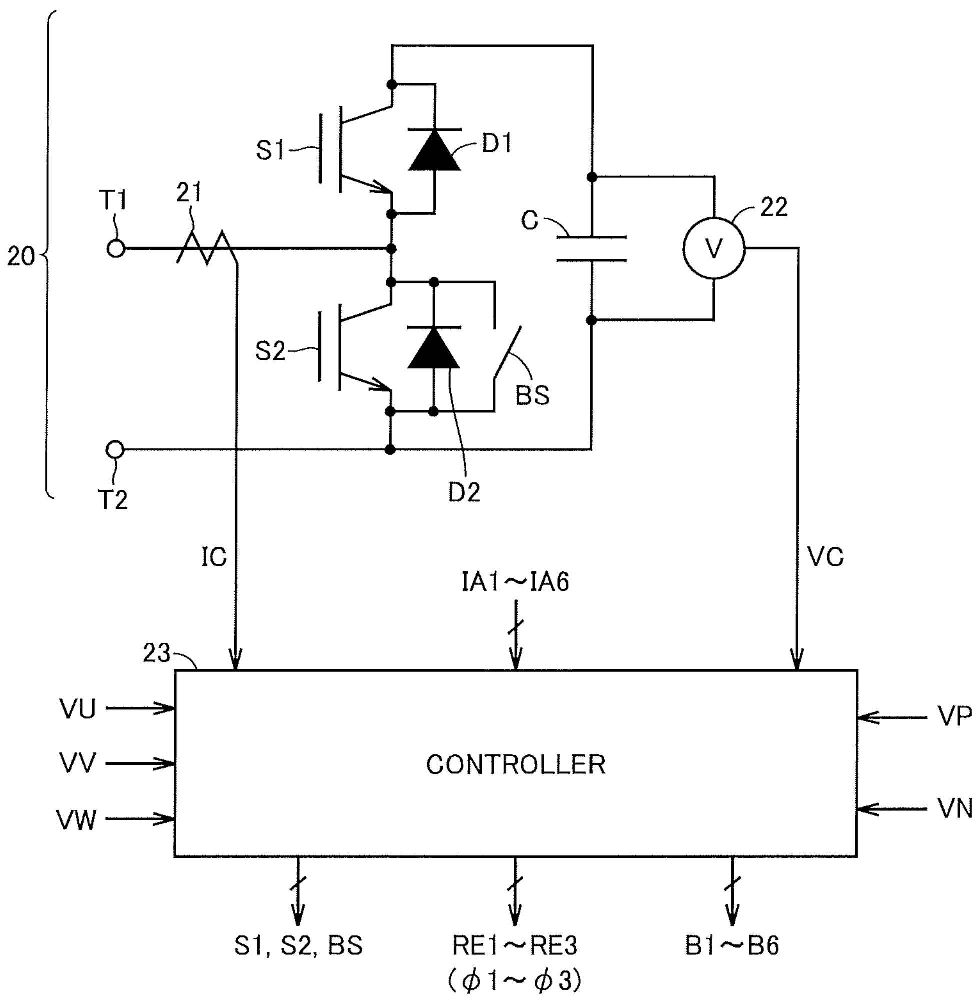
FIG. 5 is a circuit block diagram showing a configuration of a unit cell shown in FIG. 2 and a controller.

As shown in FIG. 2, each of arms A1 to A6 includes a plurality of unit cells 20 connected in cascade. As shown in FIG. 5, each of unit cells 20 includes a first terminal T1, a second terminal T2, a current detector 21, switching elements S1, S2, diodes D1, D2, a capacitor C, and a voltage detector 22. Moreover, multilevel converter 3 includes a controller 23 configured to control all the unit cells 20, rectifying elements RE1 to RE3, and the like.

Each of switching elements S1, S2 is constituted of an IGBT (Insulated Gate Bipolar Transistor), for example. Switching elements S1, S2 are connected in series between the positive and negative electrodes of capacitor C. That is, switching element S1 has a collector connected to the positive electrode of capacitor C and has an emitter connected to first terminal T1 and a collector of switching element S2, and switching element S2 has an emitter connected to second terminal T2 and the negative electrode of capacitor C.

Diodes D1, D2 are connected to switching elements S1, S2 in antiparallel, respectively. That is, diodes D1, D2 have anodes connected to respective emitters of switching elements S1, S2, and have cathodes connected to respective collectors of switching elements S1, S2. Each of diodes D1, D2 is a free wheel diode.

Current detector 21 detects an instantaneous value of current flowing between first terminal T1 and a node between switching elements S1, S2, and provides controller 23 with a signal indicating the detected value. Voltage detector 22 detects an instantaneous value of voltage VC between the electrodes of capacitor C, and provides controller 23 with a signal indicating the detected value.

As shown in FIG. 2, first terminals T1 of unit cells 20 of arms A1 to A3 at one end are connected to positive voltage terminal 3*a*. In each of arms A to A3, second terminals T2 of unit cells 20 are connected to first terminals T1 of unit cells 20 adjacent thereto in the direction of AC terminals 3*c* to 3*e*. Second terminals T2 of unit cells 20 of arms A1 to A3 at the other end are connected to respective AC terminal 3*c* to 3*e*.

First terminals T1 of unit cells 20 of arms A4 to A6 at one end are connected to respective terminals of reactors L11 to L13 at one end. In each of arms A4 to A6, second terminals T2 of unit cells 20 are connected to first terminals T1 of unit cells 20 adjacent thereto in the direction of rectifying elements RE1 to RE3. Second terminals T2 of unit cells 20 of arms A4 to A5 at the other end are connected to respective anodes of rectifying elements RE1 to RE3.

Controller 23 of FIG. 5 operates in synchronization with three-phase AC voltages VU, VV, VW from three-phase transformer 5, and controls switching elements S1, S2 of each unit cell 20 of arms A1 to A6 to convert the three-phase AC power from three-phase transformer 5 into DC power and supply it to DC power transmission lines 1, 2, or to convert the DC power from DC power transmission lines 1, 2 into three-phase AC power and supply it to three-phase transformer 5. On this occasion, controller 23 generates control signals ϕ1 to ϕ3 based on results of detections by current detectors 34 to 36 to turn on rectifying elements RE1 to RE3. Further, controller 23 controls switching elements S1, S2 based on a result of the detection by voltage detector 22 of each unit cell 20 to charge capacitor C of each unit cell 20 to a predetermined DC voltage.

Further, based on the result of the detection by current detector 21 of each unit cell 20 as well as the results of the detections by current detectors 31 to 36, controller 23 determines whether or not a short circuit accident has occurred in DC power transmission lines 1, 2. When the short circuit accident has occurred, controller 23 controls switching elements S1, S2 of each unit cell 20 to come into the non-conductive state. When switching elements S1, S2 are brought into the non-conductive state, the short circuit current flowing in switching element S2 is transferred to diode D2, thereby protecting switching elements S1, S2.

Next, controller 23 controls a mechanical bypass switch BS to come into the conductive state. When mechanical bypass switch BS is brought into the conductive state, the short circuit current flowing in diode D2 is transferred to mechanical bypass switch BS, thereby protecting diode D2.

Moreover, controller 23 controls interrupters B1 to B6 and rectifying elements RE1 to RE3 to come into the non-conductive state. When interrupters B1 to B6 are brought into the non-conductive state, AC power systems 11, 12 are electrically disconnected from three-phase transformers 5, 6, thereby interrupting the supplying of AC power to multilevel converter 3. Accordingly, the supplying of line direct current from multilevel converter 3 to DC power transmission lines 1, 2 is interrupted, whereby the line direct current (see FIG. 10) is attenuated by arc resistance of the point of accident.

Moreover, when interrupters B1 to B6 are brought into the non-conductive state, AC power systems 11, 12 are electrically disconnected from three-phase transformers 5, 6, thereby interrupting the three-phase short circuit current (see FIG. 11) flowing from the U-phase secondary terminal of three-phase transformer 5 to the V-phase secondary terminal of three-phase transformer 5 via arms A1 and A2, for example. As shown in FIG. 2, since reactors L11 to L13 are provided only at the side at which arms A4 to A6 are provided and no reactors are provided at the side at which aims A1 to A3 are provided, three-phase short circuit currents flow only at the side at which arms A1 to A3 are provided and do not flow at the side at which arms A4 to A6 are provided. Accordingly, breakdown voltages of rectifying elements RE1 to RE6 can be reduced and therefore the number of thyristors 40 and diodes 41 can be reduced, thereby attaining reduced size and cost of the device.

When rectifying elements RE to RE3 are brought into the non-conductive state, only a current flows in each of arms A4 to A6 in the forward direction of diode 41, thereby interrupting the inter-arm direct current (see FIG. 12) circulating in a path including arms A1, A2, A5, A4, and the like, for example. Thus, quick attenuation is attained.

Figure 6:
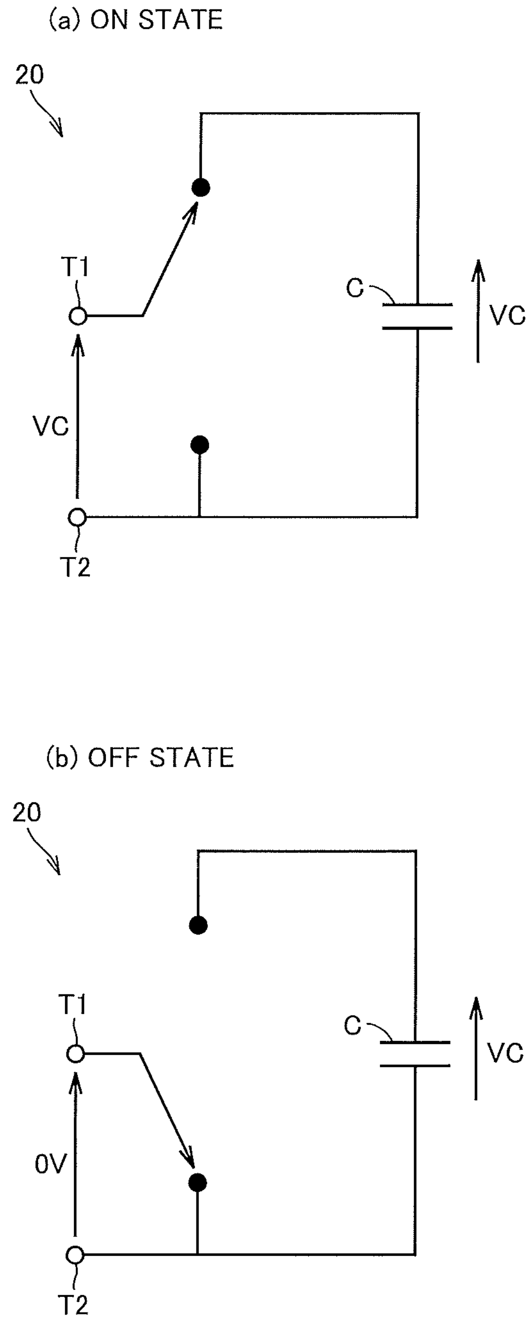
FIG. 6 is a circuit diagram showing an operation of the unit cell shown in FIG. 2.

Next, the normal operation of multilevel converter 3 will be described. During the normal operation, each unit cell 20 is in the ON state or the OFF state. In unit cell 20 in the ON state, switching element S1 is in the conductive state and switching element S2 is in the non-conductive state, and terminals T1, T2 are respectively connected to the positive and negative electrodes of capacitor C as shown in FIG. 6(*a*). When capacitor C has been charged to DC voltage VC, DC voltage VC is output between terminals T1, T2.

In unit cell 20 in the OFF state, switching element S1 is in the non-conductive state and switching element S2 is in the conductive state, and terminals T1, T2 are connected to each other and 0 V is output between terminals T1, T2 as shown in FIG. 6 (*b*). When capacitor C has been charged to DC voltage VC, the state is maintained.

Figure 7:
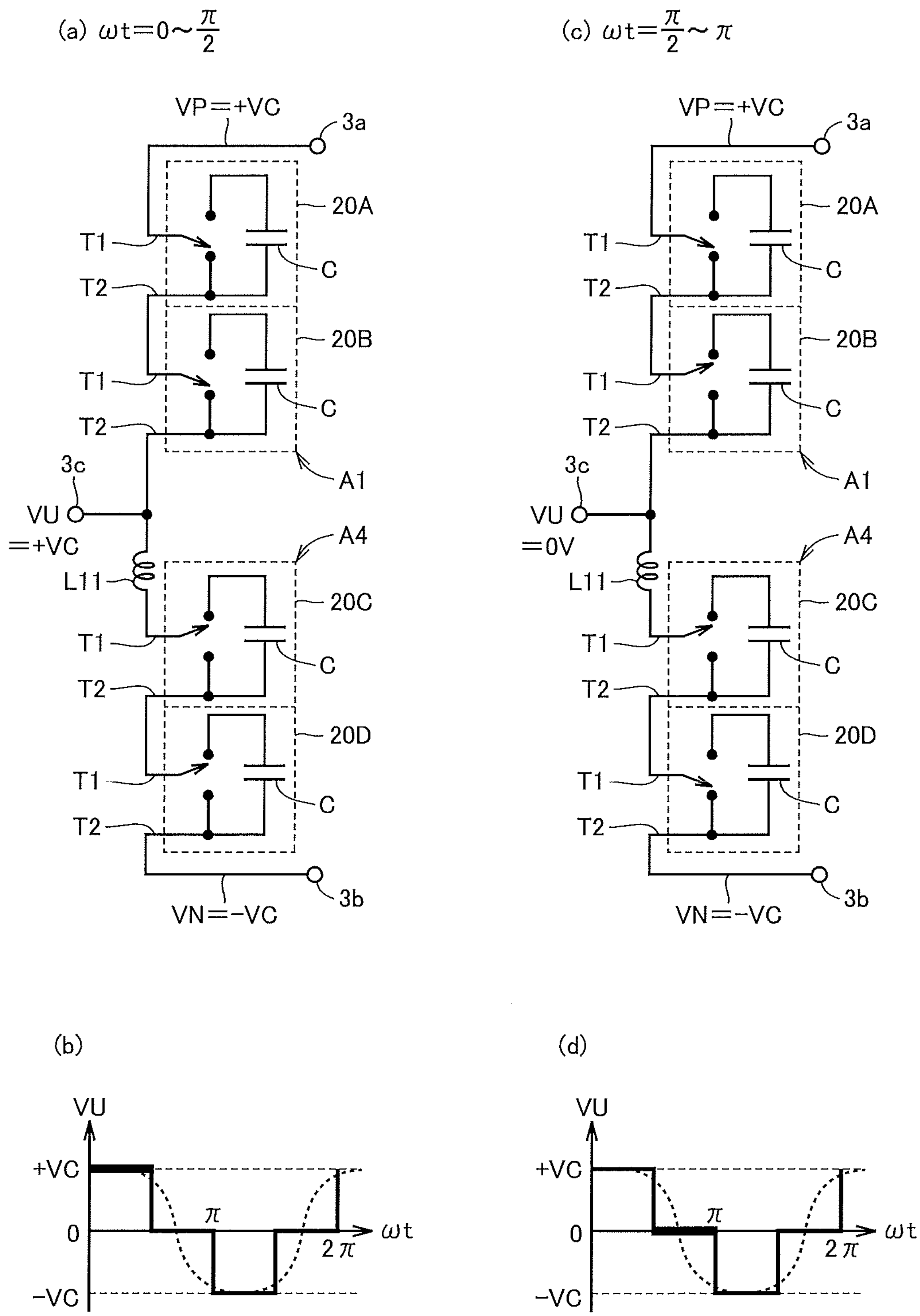
FIG. 7 is a diagram showing an operation of the multilevel converter shown in FIG. 2.
Figure 8:
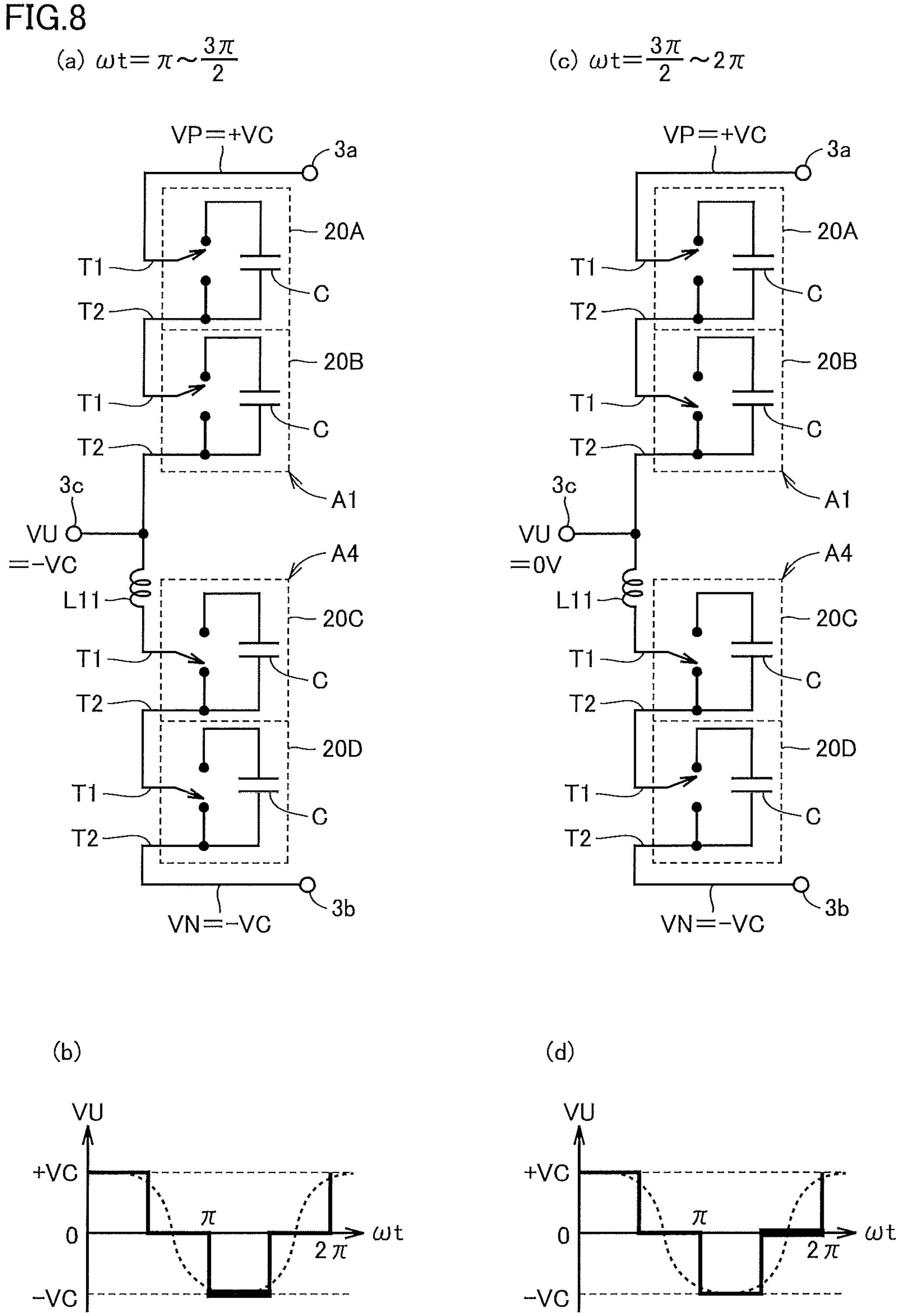
FIG. 8 is another diagram showing the operation of the multilevel converter shown in FIG. 2.

Each of FIGS. 7(*a*) to (*d*) and FIGS. 8(*a*) to (*d*) shows the normal operation of multilevel converter 3. Each of FIGS. 7(*a*) to (*d*) and FIGS. 8(*a*) to (*d*) only shows a portion thereof in connection with U-phase AC voltage VU for simplification of the drawings and description. Arm A1 includes only two unit cells 20A, 20B, and arm A4 includes only two unit cells 20C, 20D. Since rectifying elements RE1 to RE6 are in the conductive state during the normal operation, rectifying elements RE1 to RE6 and surge arresters SA1 to SA3 are not illustrated.

It is assumed that capacitors C of unit cells 20A to 20D have been charged to predetermined DC voltage VC. Positive DC voltage VP=+VC is applied to positive voltage terminal 3*a*, and negative DC voltage VN=−VC is applied to negative voltage terminal 3*b*. Multilevel converter 3 outputs three-level AC voltage VU including +VC, 0 V, and −VC. It is assumed that AC voltage VU is represented by a function of of and that one period of AC voltage VU is 2π.

During a period from ωt=0 to (ω/2), unit cells 20A, 20B are in the OFF state and unit cells 20C, 20D are in the ON state as shown in FIGS. 7(*a*) and (*b*). Accordingly, DC voltage VP=+VC of positive voltage terminal 3*a* is output to AC terminal 3*c* via unit cells 20A, 20B, whereby voltage VU of the AC terminal 3*c* becomes +VC. Between AC terminal 3*c* and negative voltage terminal 3*b*, reactor L14 and capacitors C of unit cells 20C, 20D are connected in series, whereby voltage VU of AC terminal 3*c* is maintained at +VC.

During a period from ωt=(π/2) to π, as shown in FIGS. 7(*c*) and (*d*), unit cells 20A, 20D are in the OFF state and unit cells 20B, 20C are in the ON state. Accordingly, capacitor C of unit cell 20B is connected between positive voltage terminal 3*a* and AC terminal 3*c*, and reactor L11 and capacitor C of unit cell 20C are connected in series between AC terminal 3*c* and negative voltage terminal 3*b*, whereby voltage VU of AC terminal 3*c* becomes 0 V.

During a period from ωt=π to (3π/2), unit cells 20A, 20B are in the ON state and unit cells 20C, 20D are in the OFF state as shown in FIGS. 8(*a*) and (*b*). Accordingly, DC voltage VN=−VC of negative voltage terminal 3*b* is output to AC terminal 3*c* via unit cells 20D, 20C and reactor L11, whereby voltage VU of AC terminal 3*c* becomes −VC. Capacitors C of unit cells 20A, 20B are connected in series between positive voltage terminal 3*a* and AC terminal 3*c*, whereby voltage VU of AC terminal 3*c* is maintained at −VC.

During a period from ωt=(3π/2) to 2π, unit cells 20A, 20D are in the ON state and unit cells 20B, 20C are in the OFF state as shown in FIGS. 8(*c*) and (*d*). Accordingly, capacitor C of unit cell 20A is connected between positive voltage terminal 3*a* and AC terminal 3*c*, and reactor L11 and capacitor C of unit cell 20D are connected in series between AC terminal 3*c* and negative voltage terminal 3*b*, whereby voltage VU of AC terminal 3*c* becomes 0 V.

In this way, DC voltages VP=+VC and VN=−VC are converted into the three-level AC voltage VU. The waveform of AC voltage VU can be formed into a sinusoidal wave by increasing the number of unit cells 20 in each arm.

When the phases of three-phase AC voltages VU, VV, VW generated in multilevel converter 3 are advanced with respect to the phases of the three-phase AC voltage output from three-phase transformer 5, AC power having a value corresponding to a phase difference therebetween is supplied from multilevel converter 3 to three-phase transformer 5. In this case, multilevel converter 3 operates as a DC/AC converter configured to convert the DC power from DC power transmission lines 1, 2 into AC power and supply it to three-phase transformer 5.

On the other hand, when the phases of three-phase AC voltages VU, VV, VW generated in multilevel converter 3 are delayed with respect to the phases of the three-phase AC voltage output from three-phase transformer 5, AC power having a value corresponding to a phase difference therebetween is supplied from three-phase transformer 5 to multilevel converter 3. In this case, multilevel converter 3 operates as an AC/DC converter configured to convert the AC power from three-phase transformer 5 into DC power and supply it to DC power transmission lines 1, 2. The configuration and operation of multilevel converter 4 are the same as those of multilevel converter 3, and are therefore not described repeatedly.

Figure 9:
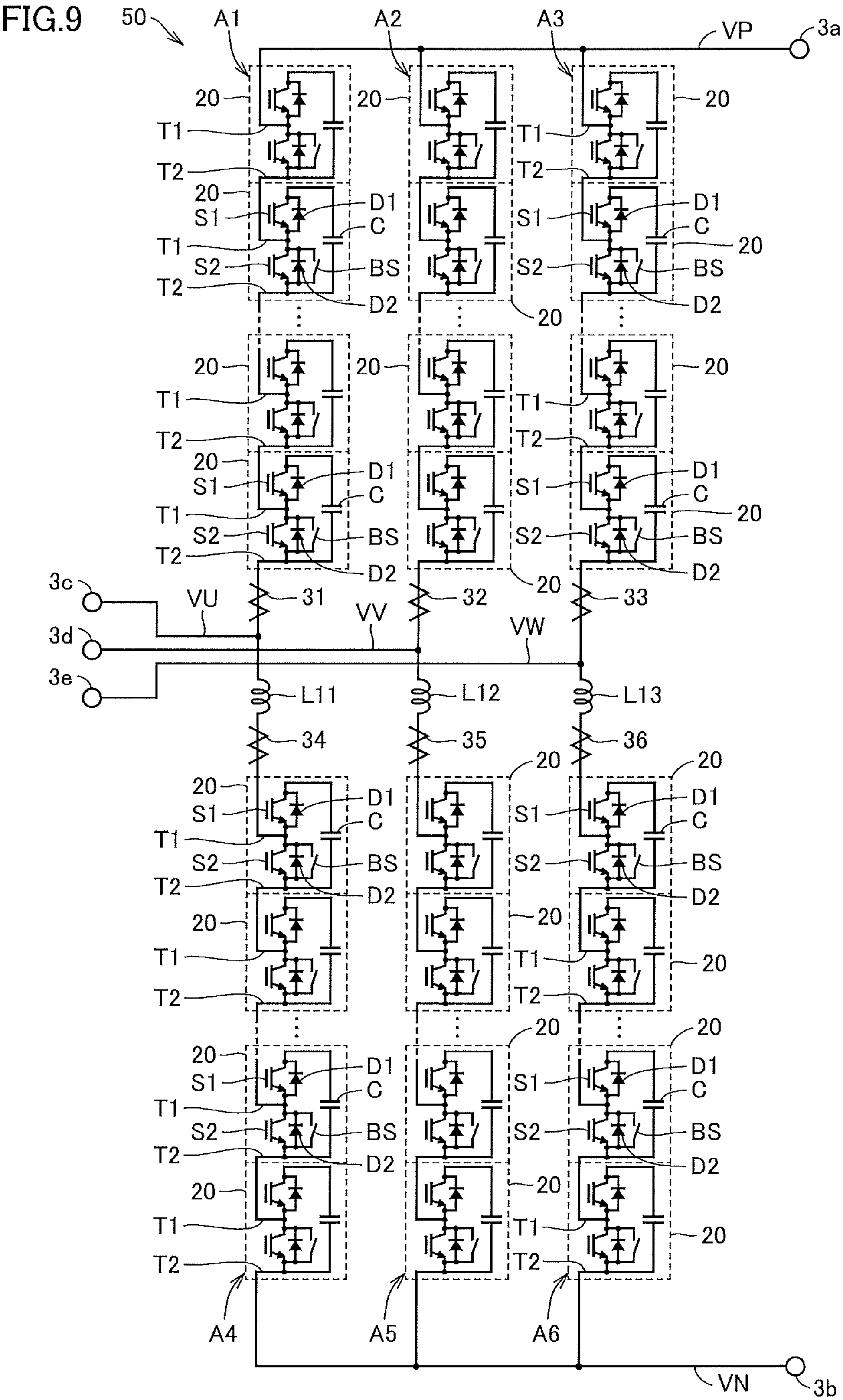
FIG. 9 is a circuit diagram showing a major portion of a multilevel converter included in a DC power transmission system serving as a comparative example for the embodiment.

FIG. 9 is a circuit diagram showing a major portion of a multilevel converter 50 included in a DC power transmission system serving as a comparative example for the present embodiment, and is a diagram compared with FIG.

2. With reference to FIG. 9, multilevel converter 50 is different from multilevel converter 3 of FIG. 2 in that rectifying elements RE1 to RE6 and surge arresters SA1 to SA3 are omitted.

Reactor L11 and arm A4 are connected in series between AC terminal 3*c* and negative voltage terminal 3*b*. Reactor L12 and arm A5 are connected in series between AC terminal 3*d* and negative voltage terminal 3*b*. Reactor L13 and arm A6 are connected in series between AC terminal 3*e* and negative voltage terminal 3*b*.

Figure 10:
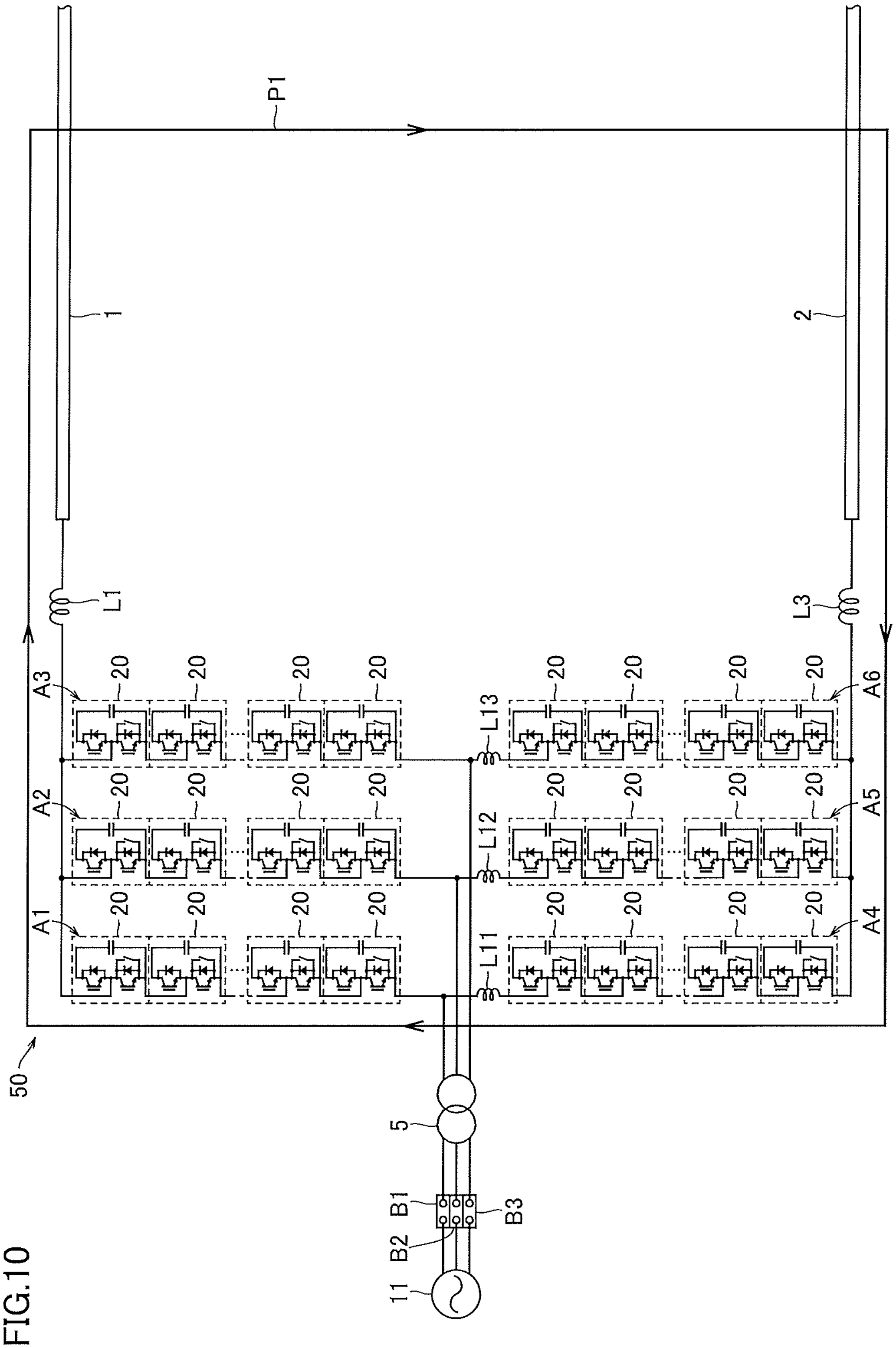
FIG. 10 is a circuit diagram showing a line direct current flowing in the DC power transmission system including the multilevel converter shown in FIG. 9 upon occurrence of a short circuit accident.

When a short circuit accident occurs in DC power transmission lines 1, 2 in the DC power transmission system including such a multilevel converter 50, a line direct current (short circuit current) flows in a path P1 as shown in FIG. 10, for example. That is, the line direct current flows in path P1 including DC power transmission line 1, a short circuit portion (not shown), DC power transmission line 2, reactor L3, arm A4, reactor L11, arm A1, reactor L1, and DC power transmission line 1. The line direct current may flow also in arms A5, A6, reactors L12, L13, and arms A2, A3. Such a line direct current can be interrupted by bringing interrupters B1 to B6 into the non-conductive state.

Figure 11:
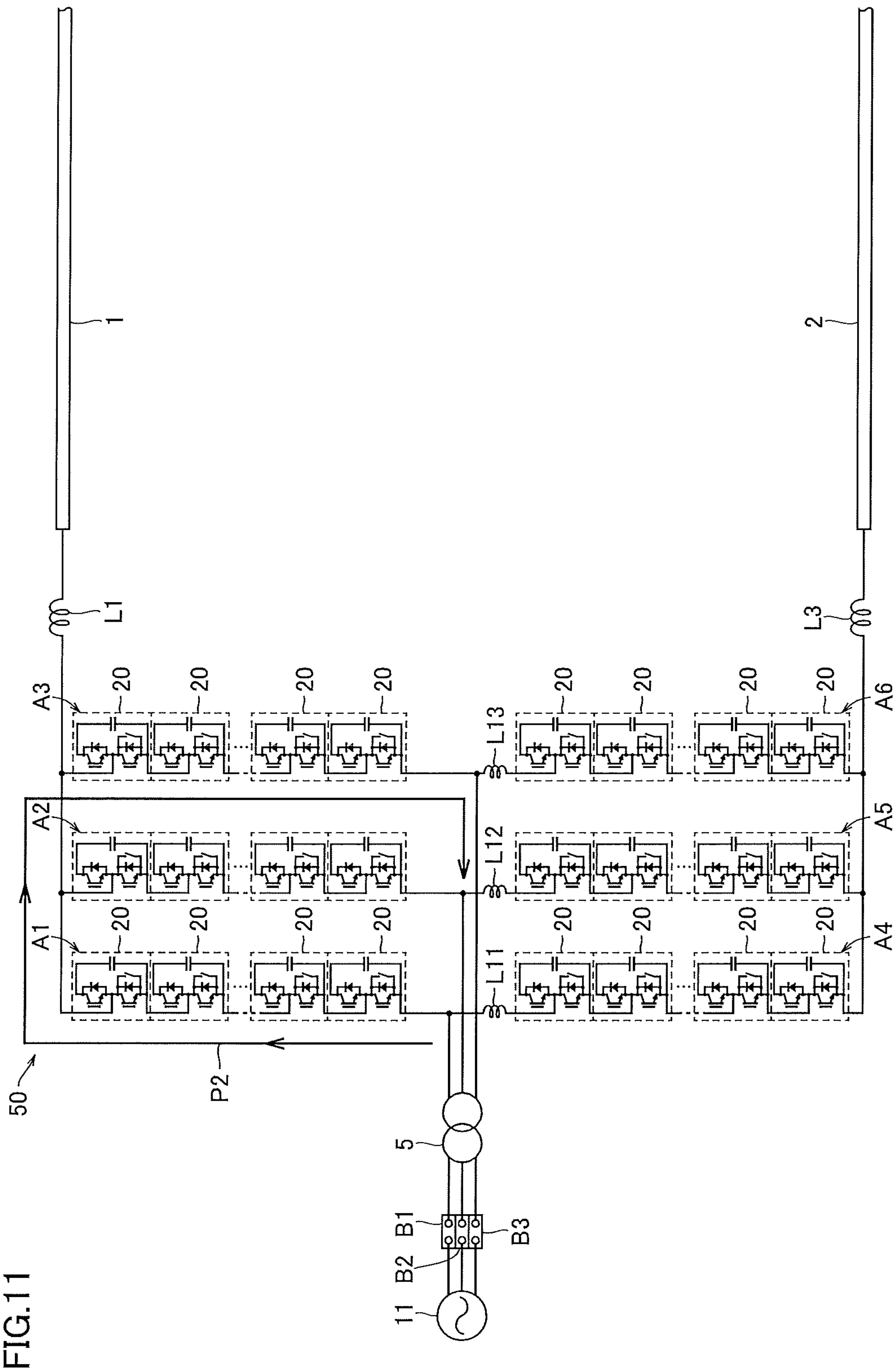
FIG. 11 is a circuit diagram showing a three-phase short circuit current flowing in the DC power transmission system including the multilevel converter shown in FIG. 9 upon occurrence of a short circuit accident.

Moreover, when mechanical bypass switch BS of each unit cell 20 is brought into the conductive state, the three secondary terminals of three-phase transformer 5 are short-circuited, with the result that three-phase short circuit current flows in a path P2 as shown in FIG. 11, for example. The three-phase short circuit current flows in path P2 including the U-phase secondary terminal of three-phase transformer 5, arms A1, A2, and the V-phase secondary terminal of three-phase transformer 5, for example. Further, the three-phase short circuit current may flow in a path including the U-phase secondary terminal of three-phase transformer 5, arms A1, A3, and the V-phase secondary terminal of three-phase transformer 5. Such a three-phase short circuit current can be interrupted by bringing interrupters B1 to B6 into the non-conductive state.

Figure 12:
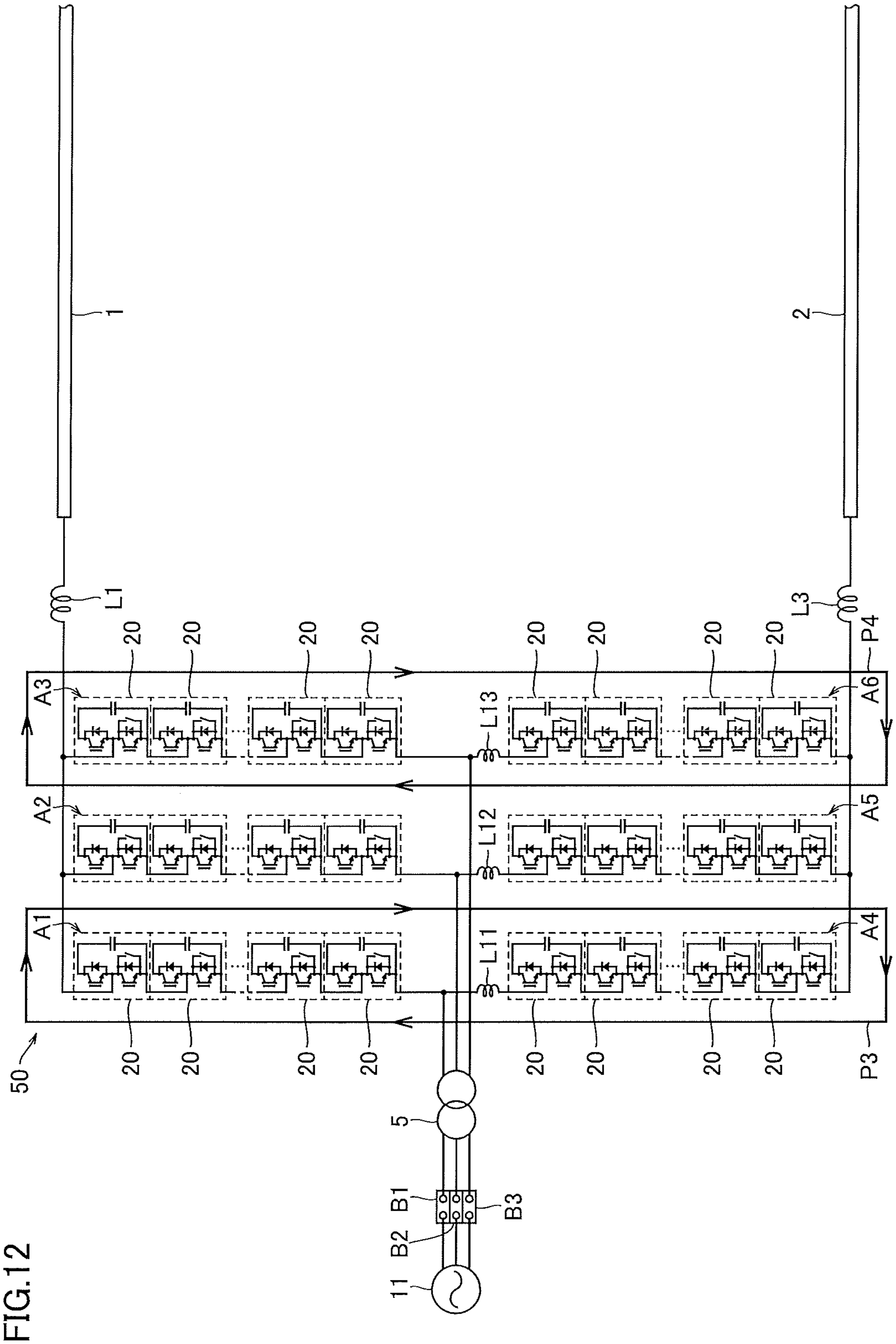
FIG. 12 is a circuit diagram showing an inter-arm direct current flowing in the DC power transmission system including the multilevel converter shown in FIG. 9 upon occurrence of a short circuit accident.

Furthermore, when mechanical bypass switch BS of each unit cell 20 is brought into the conductive state, electromagnetic energy accumulated in reactors L11 to L13 is released, with the result that inter-arm direct currents are circulated in paths P3, P4 as shown in FIG. 12, for example. That is, the inter-arm direct current flows in path P3 including reactor L11, arms A1, A2, reactor L12, and arms A5, A4. The inter-arm direct current flows in path P4 including reactor L12, arms A2, A3, reactor L13, and arms A6, A5.

In multilevel converter 50 of the comparative example, each of such inter-arm direct currents cannot be interrupted, so that it is necessary to wait for the inter-arm direct current to be attenuated by the resistance component of the circuit. The inter-arm direct current continues to flow in current path P3 while being attenuated at a time constant determined by a ratio of inductance to resistance value of current path P3, for example. In such a DC power transmission system, the resistance component is made small in order to reduce loss, so that the attenuation time constant for the inter-arm direct current is large. Therefore, when a short circuit accident occurs, the DC power transmission system cannot be restarted quickly.

On the other hand, in the present embodiment, rectifying elements RE1 to RE3 of FIG. 2 are brought into the non-conductive state, thereby interrupting and quickly attenuating the inter-arm direct current. Therefore, when a short circuit accident occurs, the DC power transmission system can be restarted quickly. Moreover, the number of thyristors 40 can be reduced to be less than the number of thyristors in the technique of Patent Document 2 (Japanese National Patent Publication No. 2009-506736), thereby attaining low cost and reduced size of the device.

Figure 13:
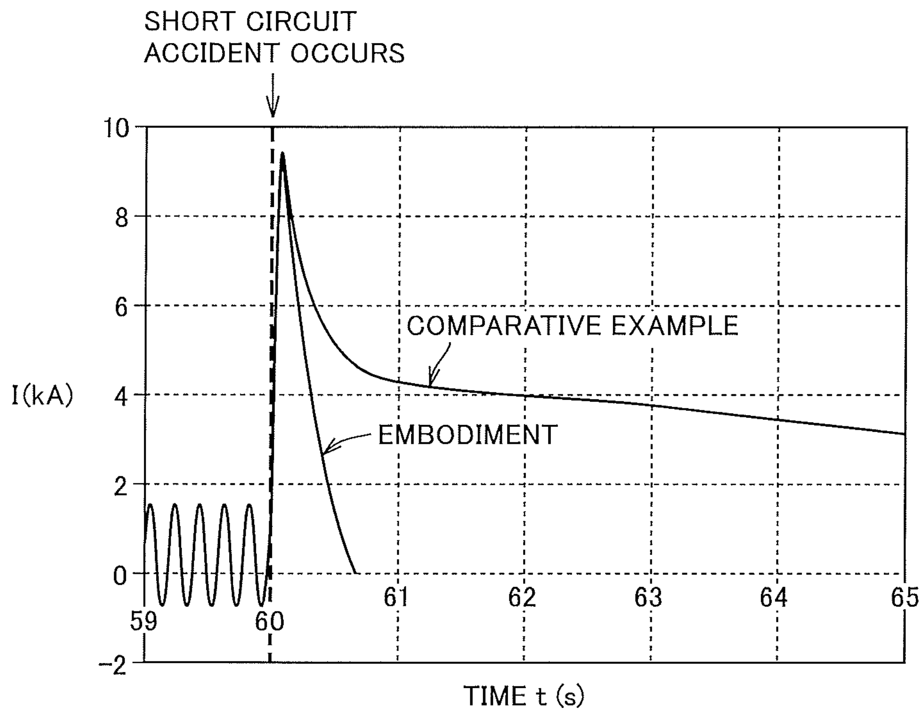
FIG. 13 is a time chart showing the inter-arm direct current in each of the embodiment and the comparative example.

FIG. 13 is a time chart showing a change of the inter-arm direct current with time in each of the present embodiment and the comparative example. In FIG. 13, in the comparative example, even 0.5 second after occurrence of a short circuit accident, the inter-arm direct current is decreased only to a value about the half of the peak value. On the other hand, in the present embodiment, 0.5 second after occurrence of a short circuit accident, the inter-arm direct current is decreased to substantially 0 A. Accordingly, according to the present embodiment, the inter-arm direct current flowing upon the occurrence of the short circuit accident can be attenuated quickly, whereby the DC power transmission system can be restarted quickly even when the short circuit accident occurs.

It should be noted that, in the present embodiment, first terminal T1 and second terminal T2 of unit cell 20 are respectively connected to the collector and emitter of switching element S2 and mechanical bypass switch BS is connected to diode D2 in parallel; however, it is not limited to this, and the same result is obtained when first terminal T1 and second terminal T2 of unit cell 20 are respectively connected to the collector and emitter of switching element S1 and mechanical bypass switch BS is connected to diode D1 in parallel.

Figure 14:
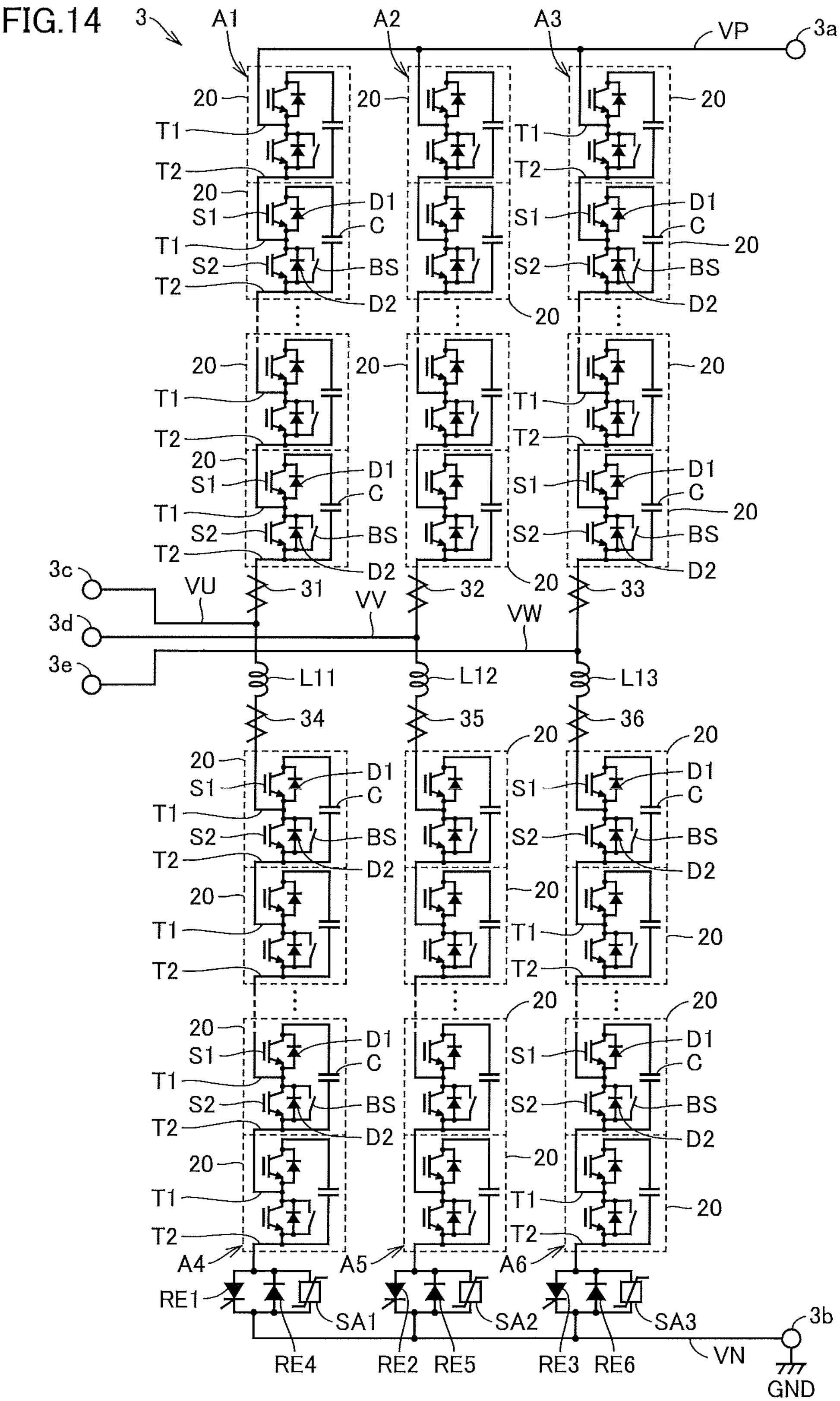
FIG. 14 is a circuit diagram showing a modification of the embodiment.

FIG. 14 is a circuit diagram showing a modification of the present embodiment, and is a diagram compared with FIG. 2. With reference to FIG. 14, in this modification, a ground voltage GND is applied to negative voltage terminal 3*b* of multilevel converter 3. In this modification, a potential difference between each of rectifying elements RE1 to RE3 and ground voltage GND can be reduced to readily insulate rectifying elements RE1 to RE3 from ground voltage GND.

Figure 15:
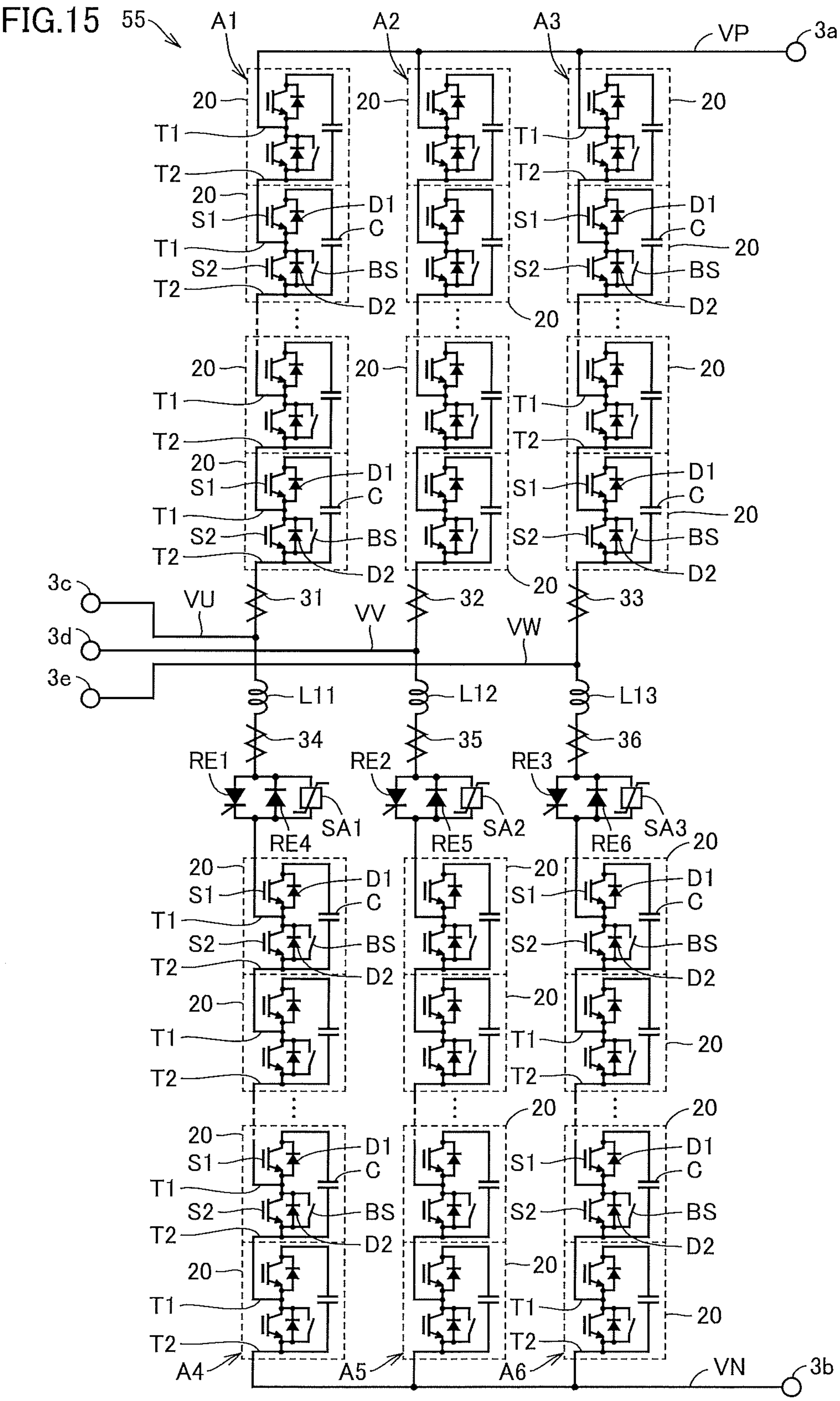
FIG. 15 is a circuit diagram showing another modification of the embodiment.

FIG. 15 is a circuit diagram showing a configuration of a multilevel converter 55 serving as another modification of the present embodiment, and is a diagram compared with FIG. 2. With reference to FIG. 15, multilevel converter 55 is different from multilevel converter 3 of FIG. 2 in that rectifying elements RE1 to RE6 and surge arresters SA1 to SA3 are connected between reactors L11 to L13 and arms A4 to A6.

Specifically, reactor L11, rectifying element RE1, and arm A4 are connected in series between AC terminal 3*c* and negative voltage terminal 3*b*. Reactor L12, rectifying element RE2, and arm A5 are connected in series between AC terminal 3*d* and negative voltage terminal 3*b*. Reactor L13, rectifying element RE3, and arm A6 are connected in series between AC terminal 3*e* and negative voltage terminal 3*b*. Rectifying elements RE4 to RE6 are respectively connected to rectifying elements RE1 to RE3 in antiparallel. Surge arresters SA1 to SA3 are respectively connected to rectifying elements RE1 to RE3 in parallel.

In this modification, a potential difference between each of rectifying elements RE1 to RE3 and ground voltage GND can be reduced to readily insulate rectifying elements RE1 to RE3 from ground voltage GND.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST 1, 2: DC power transmission line; B1 to B6: interrupter; L1 to L4, L11 to L13: reactor; 3, 4, 50, 55: half bridge type modular multilevel converter; 3*a*, 4*a*: positive voltage terminal; 3*b*, 4*b*: negative voltage terminal; 3*c* to 3*e*, 4*c* to 4*e*: AC terminal; 5, 6: three-phase transformer; 11, 12: AC power system; A1 to A6: arm; 20: unit cell; T1: first terminal; T2: second terminal; 21, 31 to 36: current detector; S1, S2: switching element; D1, D2, 41: diode; BS: mechanical type bypass switch; C: capacitor; 22: voltage detector; 23: controller; 40: thyristor.

The invention claimed is:

1. A power converter configured to transmit and receive power between an AC power supply and a DC power supply, the power converter comprising:

first and second DC terminals configured to transmit and receive DC power to and from the DC power supply;

an AC terminal configured to transmit and receive AC power to and from the AC power supply;

a first arm connected between the first DC terminal and the AC terminal;

a second arm connected between the AC terminal and the second DC terminal, each of the first and second arms including a plurality of unit cells connected in cascade, each unit cell including a capacitor, first and second switching elements, first and second diodes, and a mechanical bypass switch, the capacitor being configured to be charged to a predetermined DC voltage, the first and second switching elements being connected in series between electrodes of the capacitor, the first and second diodes being respectively connected to the first and second switching elements in antiparallel, the mechanical bypass switch being connected to the first or second diode in parallel, the mechanical bypass switches of the plurality of unit cells being connected in series in each of the first and second arms, the first and second switching elements of each unit cell being configured to alternately come into a conductive state during a normal operation, both the first and second switching elements of each unit cell being configured to come into a non-conductive state when a short circuit accident occurs at the DC power supply side, the mechanical bypass switch of each unit cell being configured to be in the non-conductive state during the normal operation, the mechanical bypass switch of each unit cell being configured to come into the conductive state when the short circuit accident occurs;

a first rectifying element connected between the first and second DC terminals in series with the first and second arms, the first rectifying element being configured to be in the conductive state during the normal operation to permit a current to flow in a first direction, the first rectifying element being configured to come into the non-conductive state when the short circuit accident occurs; and a second rectifying element connected to the first rectifying element in antiparallel, the second rectifying element being configured to permit the current to flow in a second direction opposite to the first direction.

2. The power converter according to claim 1, wherein the first rectifying element includes a plurality of thyristors connected in series to permit the current to flow in the first direction, and the second rectifying element includes a plurality of diodes connected in series to permit the current to flow in the second direction.

3. The power converter according to claim 1, further comprising a surge arrester connected to the first rectifying element in parallel, the surge arrester being configured to permit a surge current to flow.

4. The power converter according to claim 1, further comprising a reactor, wherein the reactor is connected between the AC terminal and the second DC terminal in series with the second arm and the first rectifying element.

5. The power converter according to claim 1, further comprising:

a current detector configured to detect the current flowing in the first and second arms; and a controller configured to determine, based on a result of the detection by the current detector, whether or not the short circuit accident has occurred, and to control each unit cell and the second rectifying element based on a result of the determination.

6. The power converter according to claim 1, wherein the first DC terminal is supplied with a positive DC voltage, and the second DC terminal is supplied with a negative DC voltage.

7. The power converter according to claim 1, wherein the first DC terminal is supplied with a positive DC voltage, and the second DC terminal is grounded.

8. The power converter according to claim 1, wherein the AC power is three-phase AC power, and three groups each including the AC terminal, the first arm, the second arm, the first rectifying element, and the second rectifying element are provided.

* * * * *